UNITED STATES PATENT OFFICE.

ANSIL MOFFATT, OF INDIANAPOLIS, INDIANA, ASSIGNOR TO EBEN H. WOLCOTT, TRUSTEE FOR ASSOCIATE UNDERWRITER AND SAID MOFFATT.

VEGETABLE ALBUMINOID AND PROCESS OF PRODUCING IT.

1,425,033. Specification of Letters Patent. Patented Aug. 8, 1922.

No Drawing. Application filed August 24, 1918. Serial No. 251,251.

*To all whom it may concern:*

Be it known that I, ANSIL MOFFATT, a citizen of the United States, residing at Indianapolis, in the county of Marion and State of Indiana, have invented a new and useful Vegetable Albuminoid and Processes of Producing It, of which the following is a specification.

It is the object of my invention to produce direct from grains, legumes, and other vegetable matter a food containing only nitrogenous matter (or proteids), with such residual fatty matter as may have been in the raw material used.

This food is largely the same chemically as lean meat or cheese, and has substantially the same nutritive value: but it may be produced much more quickly and economically, and with many times the amount of final food produced, than can be done by feeding the grain to animals (cattle, sheep, or hogs) and using the meat from them.

I produce this food by taking any cereal grain or any legume, or other suitable vegetable matter, treating it with an amylolytic agent until all the starches and other carbohydrates (except cellulose) are rendered soluble and dissolving them, draining away the solution to remove such starches and other carbohydrates and thoroughly washing the insoluble residue, which comprises insoluble albuminoids or proteids together with such fats of high molecular weight and such fibrous cellulose and mineral matter as may have been present in the original raw material. This residue is a nutritious food, which may be rendered palatable by introducing various flavors and condiments, or other additions, and by expressing the water until the residue attains the desired consistency.

In my preferred way of practicing my invention, I use either hydrochloric acid or sulphuric acid as the amylolytic agent, in a dilute aqueous solution having a strength of about one-half per cent ($\frac{1}{2}\%$) of real acid in water; and I use Indian corn as the raw material from which to start. Into the dilute acid solution I place the Indian corn, which may be either whole or roughly ground, and heat the mixture to the boiling point, at which temperature I maintain it until a test portion taken from it will give no starch reaction when treated with iodine. Then the amylolysis is complete, and all the starch and starchy matters have been rendered soluble, largely by being converted into sugars. The mixture is then thrown into a draining apparatus, and well drained; the liquid obtained therefrom is set aside for other uses, which may involve concentration, but which constitutes no part of the present invention. The insoluble albuminoid residue is then thoroughly washed, with successive portions of fresh water, each washing being set aside for its appropriate subsequent use, and the weakest or last washing (with hydrochloric or sulphuric acid added to it to produce the desired strength) being used for boiling up the next batch of raw material. When the albuminoid residue has been thoroughly washed so that it is entirely free from starch, sugar, and other fermentable matter, it is placed in a press to press out any desired amount of the remaining water and produce cakes of the desired consistency, preferably of the consistency of ordinary cheese. These cakes then contain about forty or fifty per cent (40 or 50%) of water. These cakes are a vegetable albuminoid food, containing the nitrogenous matters of the original raw material together with such fats, fibre, and mineral matter as may have been in such raw material, but being entirely free from starch, sugar, and other similar carbohydrates. This food is thus produced direct from the grain.

Before pressing, the albuminoid residue may be ground in suitable mills to render it homogenous, and any desired flavors or condiments, or other matter which it is desired to mix with it, may be introduced, conveniently in the grinding operation, so as to produce the desired flavor.

I claim as my invention:

1. The process of producing a vegetable albuminoid food, which consists in submitting vegetable matter, as grains or legumes, to the action of an amylolytic acid, boiling the mixture until all the starch is converted into soluble matter, draining off the resultant liquid containing the amylolytic acid and soluble matter, and washing from the insoluble residue of insoluble albuminoids and fats, the soluble products of the amylolysis.

2. The process of producing a vegetable albuminoid food, which consists in submitting vegetable matter, as grains or legumes, to the action of an amylolytic acid, draining off the resultant liquid containing the amylolytic acid and soluble matter, and washing from the insoluble residue of insoluble albuminoids and fats the soluble products of the amylolysis.

3. The process of producing a vegetable albuminoid food, which consists in submitting vegetable matter, as grains or legumes, to the action of an amylolytic acid, draining off the resultant liquid containing the amylolytic acid and soluble matter, washing from the insoluble residue of insoluble albuminoids and fats the soluble products of the amylolysis, and expressing water from such insoluble residue until the desired consistency is obtained.

4. The process of producing a vegetable albuminoid food, which consists in submitting vegetable matter, as grains or legumes, to the action of an amylolytic acid, draining off the resultant liquid containing the amylolytic acid and soluble matter, washing from the insoluble residue of insoluble albuminoids and fats the soluble products of the amylolysis, and mixing with such residue other materials to produce the desired flavor.

In witness whereof, I have hereunto set my hand at Indianapolis, Indiana, this 21st day of August, A. D. one thousand nine hundred and eighteen.

ANSIL MOFFATT.